INVENTOR.
BERNARD J. BISNETT
RALPH M. HEINTZ

BY John J. Leavitt

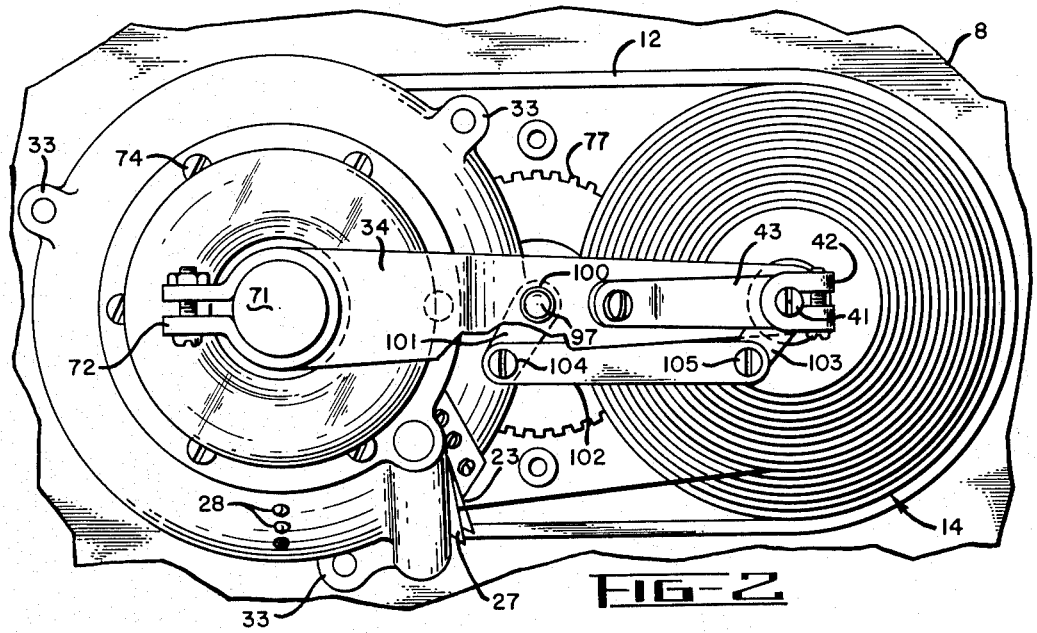
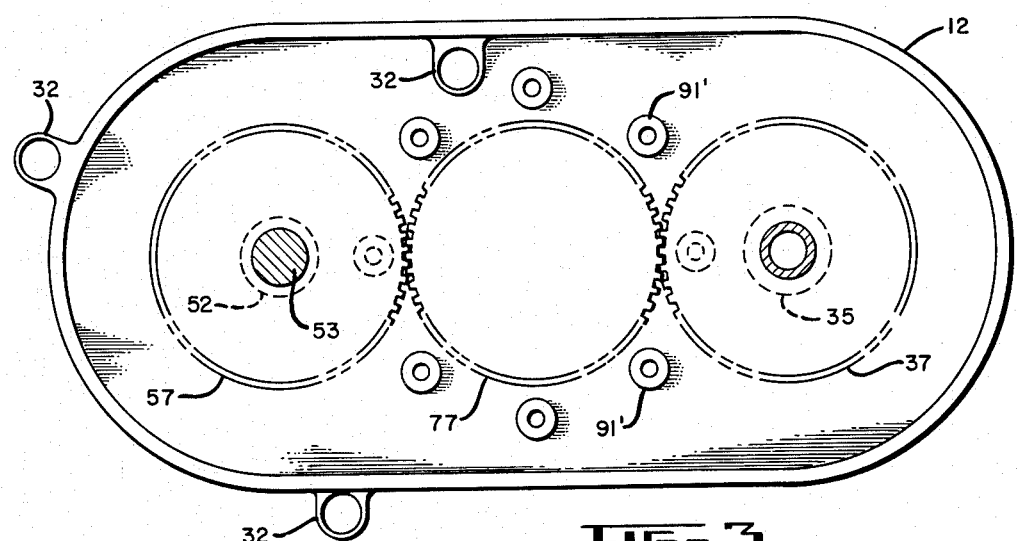
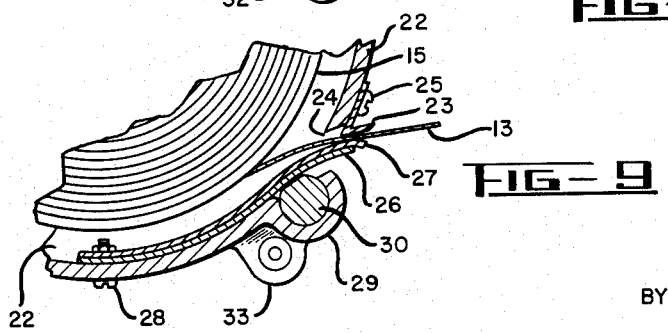

June 21, 1966 B. J. BISNETT ETAL 3,257,632
RESONANT CIRCUIT APPARATUS
Filed Nov. 18, 1963 3 Sheets-Sheet 3

INVENTOR.
BERNARD J. BISNETT
RALPH M. HEINTZ
BY John J. Leavitt

United States Patent Office 3,257,632
Patented June 21, 1966

3,257,632
RESONANT CIRCUIT APPARATUS
Bernard J. Bisnett and Ralph M. Heintz, Los Gatos, Calif., assignors to Linear Systems, Inc., Los Gatos, Calif., a corporation of California
Filed Nov. 18, 1963, Ser. No. 324,440
18 Claims. (Cl. 334—69)

This invention relates to apparatus comprising an inductor and a capacitor specifically arranged to provide a resonant circuit. The invention also relates to a special variable inductor construction which is particularly useful in resonant circuit apparatus.

One of the objects of the invention is to provide a compact inductor and capacitor assembly which has a unitary construction for convenient installation as a component in electrical equipment. A related object is to provide an inductor and capacitor assembly which can be mounted in a variety of positions so as to conform to the requirements of different types of equipment.

Another object of the invention is to provide an inductor and capacitor assembly in which the inductor has minimum distributed capacitance.

A further object of the invention is to provide a variable inductor and capacitor assembly in which the inductor has improved efficiency by virtue of having a smaller coil diameter at its high frequency setting than at its low frequency setting.

An additional object of the invention is to provide an inductor and capacitor assembly having an improved inductor of the type comprising a coil wound on adjacent storage and inductor drums to avoid dead-end effects.

Another object of the invention is to provide an inductor and capacitor assembly having a double-drum type inductor in which the inductor drum is not simply a cylinder as in prior art drums but is given a contoured or non-cylindrical shape so that the inductance curve plotted versus turns of the inductor drum is given a predetermined desired shape. A related specific object is to provide an inductor and capacitor assembly having a double-drum type inductor in which the inductor drum is so shaped that inductance plotted versus turns of the drum is a substantially straight line.

Another object of the invention is to provide a variable inductor and capacitor assembly having a double-drum type inductor and arranged so that adjustment of the assembly causes the inductance and capacitance to vary in direct proportion one to the other in order to maintain a constant ratio of inductance over capacitance so the Q of the circuit will remain substantially constant throughout a wide tuning range.

A further object of the invention is to provide a variable inductor and capacitor assembly having means for locking the inductor and capacitor in any desired position of adjustment.

Another object of the invention is to provide a variable inductor and capacitor assembly having a double-drum type inductor in which the shorted end of the inductor coil is engaged by positive contact shorting means separate from the storage drum.

An additional object of the invention is to provide an improved double-drum type variable inductor.

By way of brief description, the preceding objects are provided in a preferred embodiment which comprises a double drum type inductor formed by coniformed or tapered drums. A helical step is formed on the surface of each drum, and the inductor coil is wound on said step. A conventional capacitor is mounted adjacent one end of the storage drum, and drive means are provided for operating the variable inductor and capacitor in unison.

These and other objects and features of advantage will be apparent to those skilled in the art from a reading of the following detailed description wherein reference is made to the accompanying drawings, in which:

FIGURE 2 is an end view taken from the line 2—2 in FIGURE 1;

FIGURE 3 is a view of the mounting plate of the apparatus as seen from the line 3—3 in FIGURE 1, with other parts omitted, but showing the various drive gears in place;

FIGURE 9 is a cross sectional view on the line 9—9 of FIGURE 1.

Figure 1:
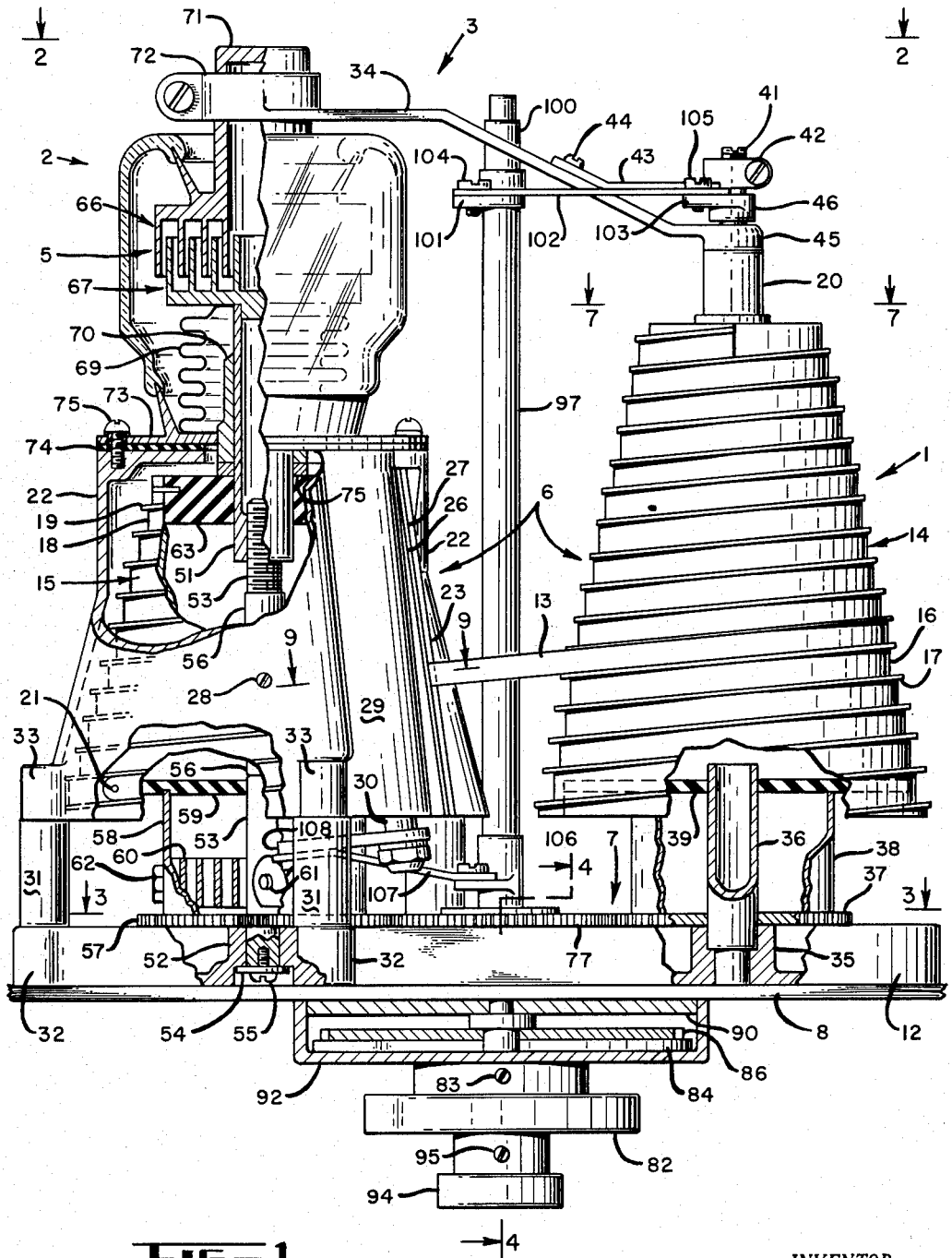
FIGURE 1 is a top view of a preferred embodiment of the invention mounted on the wall of a piece of electrical equipment and showing parts cut away.

Referring to the drawings in more detail, FIGURE 1 shows a preferred embodiment comprising a mounting plate 12 on which is mounted the inductor indicated generally at 1 and the capacitor indicated generally at 2. As will be hereinafter described more specifically, the small diameter end of the inductor is connected to one side of the capacitor by conducting means indicated broadly at 3. The other end of the inductor can be connected directly to the other side of the capacitor to provide a parallel resonant circuit, or said other ends of the inductor and capacitor can be electrically separated to provide a series resonant circuit. The means for varying the capacitance are the concentric plates indicated generally at 5. The means for varying the inductor are the double drums indicated broadly at 6. The common means for simultaneously adjusting the inductor and capacitor are indicated broadly at 7. The apparatus is adapted to be mounted on a wall or front panel 8 of a piece of electrical equipment.

Figure 8:
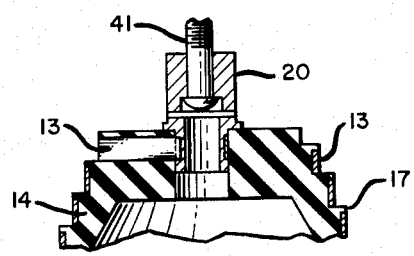
FIGURE 8 is a cross sectional view on the line 8—8 of FIGURE 7.

The inductor structure comprises a metal strip 13, which forms the inductor coil per se, and is preferably formed as a thin ribbon of low resistance material. Strip 13 is wound on an inductor shaping drum 14 and a storage drum 15. Drum 14 is of insulating material, at least on its outer surface. The material for drum 15 is not of electrical importance and for structural reasons is preferably metal. It will be noted that drum 14 has a coniform or tapered outline. Although the drum 14 is shown to have a straight-line taper, it should be understood that the taper might also be curved and still achieve many of the purposes of the invention. As pointed out in the objects, an even broader concept of the invention is that drum 14 be purposely made non-cylindrical in whatever manner is required to obtain a desired shape of inductance curve plotted versus turns of the drum 14. The drum is provided with a helical winding step 16 formed thereon, the turns of the step being preferably separated by a helical ridge 17. Similarly, the storage drum has a winding step 18 and a helical separating or guiding ridge 19. One physical and electrical end of the coil strip 13 is electrically connected to a metal sleeve 20 (FIGURE 8) which is bonded in the narrow end of drum 14. The other physical end of strip 13 is connected to the large diameter end of the storage drum 15 as by a pin 21. However, the electrically effective other end of the inductor is where coil strip 13 enters a metal casing 22 surrounding the storage drum 15.

As shown best in FIGURES 1 and 9, an L-shaped metal contact bar 23 is secured along a slot 24 in casing 22 by screws 25. Two spring metal strips 26, 27 are secured to casing 22 on the other side of slot 24 and cooperate with bar 23 to form a smooth guide and electrical connection for the coil strip 13. Guide strips 26 and 27 are secured in place by a plurality of bolts 28. Casing 22 has an enlarged portion 29 which houses a lock and release rod 30 which has a flat along one side. In the position shown in FIGURE 9, the rod 30 allows strips 26 and 27 to exert a loose pressure against coil strip 13 which allows strip 13 to slide easily between guide strip 27 and bar 23 when the drums 14 and 15 are rotated to adjust the inductance and capacitance. However, when rod 30 is rotated, it cams guide strip 27 firmly against coil strip 13, to lock the coil against physical movement and to provide a tight electrical connection between coil strip 13 and casing 22. Casing 22 and mounting plate 12 are electrically separated but are joined together mechanically by means of three insulating rods 31 secured by screws through three ears 32 on plate 12 and three ears 33 on casing 22.

The coil-shaping drum 14 is supported at one end by the support plate 12 and at the other end by a metal strap 34. More specifically, plate 12 has a boss 35 in which a stub shaft 36 is rigidly secured. A gear 37 is rotatably journalled on shaft 36 and is bonded to one end of a support cylinder 38. The other end of cylinder 38 is bonded to a face disk 39 secured in the end of drum 14 and rotatably journalled on shaft 36. Thus, drum 14 is rigidly connected to and rotates with gear 37. As shown best in FIGURES 1, 2 and 8, the small diameter end of drum 14 is rotatably mounted on a shaft 41 by means of the sleeve 20.

The upper end of shaft 41 is threaded to provide a locking mechanism. More specifically, shaft 41 is held against rotation by a threaded split fitting 42 on the end of a short strap 43 which is connected to the longer strap 34 by a screw 44. Shaft 41 is also supported by a collar 45 on the end of strap 34, in which collar the shaft is slidingly received for relative rotational and axial movement. A locking nut 46 is threaded on shaft 41 and shown in its unlocked position in which sleeve 20 is free to rotate around the smooth portion of shaft 41. Shaft 41 has a left hand thread so that when nut 46 is rotated counterclockwise as viewed from the top of FIGURE 1, it will move downwardly on the shaft and abut collar 45. This motion pulls sleeve 20 tightly against collar 45 and prevents rotation of sleeve 20, and therefore prevents rotation of drum 14.

The coil storage drum 15 is supported at one end by the support plate 12 and at the other end by a stem 51 on the capacitor 2. More specifically, plate 12 has a boss 52 in which a shaft 53 is rotatably journalled, being held in place by a washer 54 and screw 55. The ends of shaft 53 are preferably metal but the center portion 56 is of dielectric material. A gear 57 is rigidly secured to shaft 53 and rotatably abuts one end of a spacing cylinder 58. The other end of cylinder 58 is bonded to a dielectric face disk 59 which is rigidly secured in the end of drum 15 and rotatably journalled on shaft 53. Thus, shaft 53 and gear 57 are rigidly connected together for rotation in unison, but drum 15 does not have a positive drive connection to shaft 53 or gear 57. Instead, drum 15 is driven by a spiral metal spring 60. The inner end of spring 60 is connected to shaft 53 by a pin 61, and the outer end is connected to cylinder 58 by a screw 62. Spring 60 is prewound during assembly so that, with gear 57 in any given position, drum 15 is always biased toward counterclockwise rotation as viewed from the bottom of FIGURE 1. As a result, the coil strip 13 is always under constant tension to insure smooth operation. The small diameter end of drum 15 has secured therein a dielectric end disk 63 having a central bore which fits rotatably around stem 51 on the capacitor.

The capacitor is a conventional vacuum dielectric variable capacitor, for example the general type disclosed in detail in U.S. Patent No. 2,740,927, issued April 3, 1956 to Jo Emmett Jennings et al. The capacitor comprises in general a stationary set of cylindrical plates 66, and a movable set of cylindrical plates 67 telescopically received within the stationary set. The movable set 67 is carried on one end of the operating stem 51 and is sealed by a flexible metal bellows 69. The other end of stem 51 is threaded on the end of shaft 53. Stem 51 does not rotate and is supported for axial movement in a guide sleeve 70. Thus, when shaft 53 is rotated, it will cause the stem 51 to move along the axis of the capacitor to increase or decrease the overlapping relation of plates 66 and 67. More specifically, shaft 53 has left hand threads so that when the shaft is rotated clockwise, as viewed from the bottom of FIGURE 1, stem 51 will be forced upwardly to increase the overlapping relation of plates 66 and 67, and thus increase the capacitance.

The upper end of the capacitor as viewed in FIGURE 1 provides a hollow terminal post 71 to which is attached a split collar 72 on the end of strap 34. The lower end of the capacitor carries a brazed-on mounting ring 73 which is used to mechanically connect the capacitor to casing 22. If the mounting ring 73 were in direct contact with casing 22, the inductor and capacitor would thus be automatically connected to form a parallel resonant circuit. In order to make the apparatus more versatile, a dielectric ring 74 is inserted between casing 22 and mounting ring 73, and ring 73 is held in place by dielectric screws 75. Thus, in FIGURE 1 the lower ends of the inductor and capacitor are electrically separated. More specifically, the lower end of the inductor coil 13 is electrically terminated at casing 22 by the contact with strips 23, 27, and the lower end of the capacitor terminates at ring 73. Thus, casing 22 and ring 73 can be separately connected to associated circuitry to provide a series resonant circuit, or casing 22 and ring 73 can be connected together to provide a parallel resonant circuit. A washer 76 is located between the end disk 63 and the sleeve 70 to facilitate rotation of the disk 63 and drum 15 relative to the sleeve.

Figure 4:
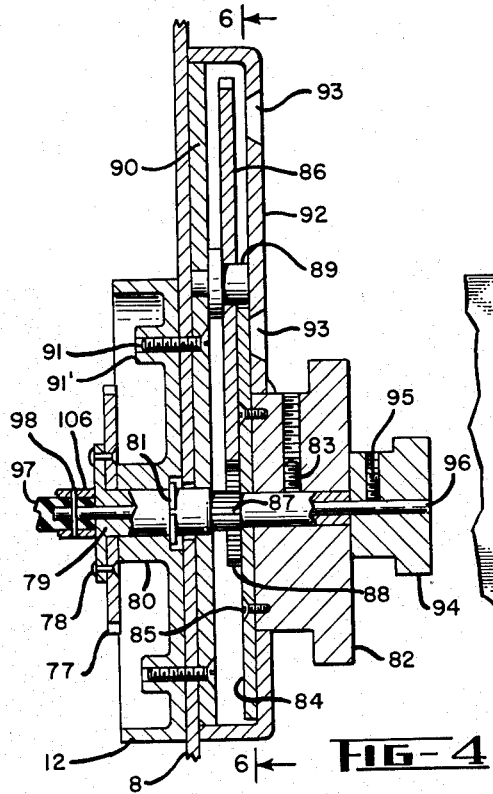
FIGURE 4 is a cross sectional view on the line 4—4 in FIGURE 1.
Figure 5:
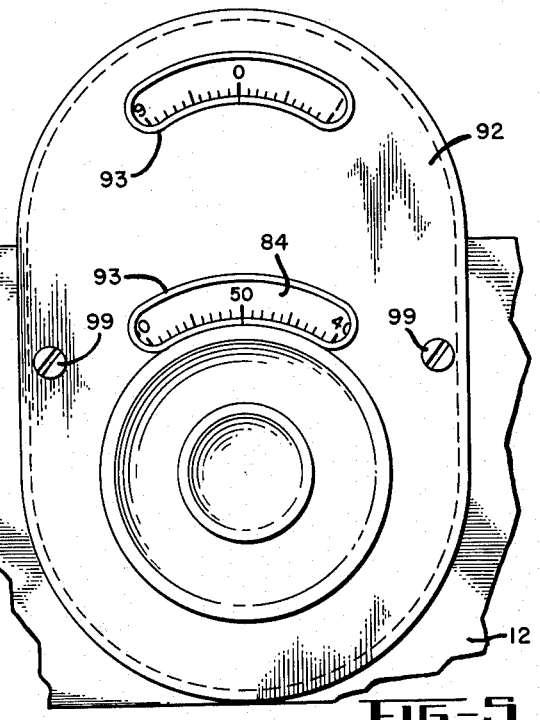
FIGURE 5 is a front view of the apparatus as seen from the right of FIGURE 4 and the bottom of FIGURE 1 but showing the assembly removed from the wall of the electrical equipment.
Figure 6:
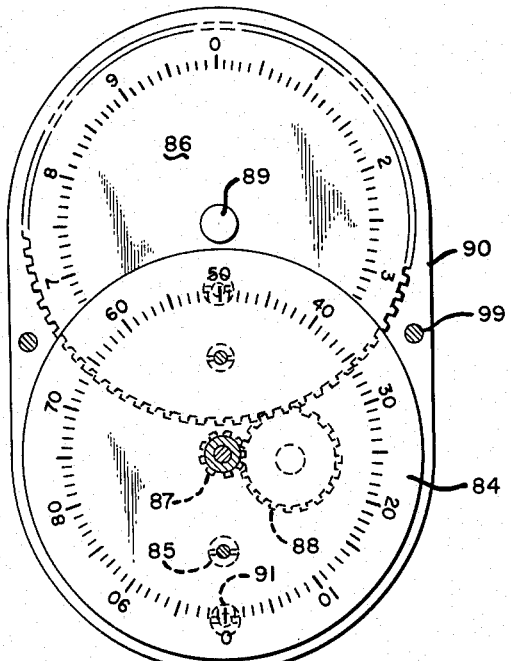
FIGURE 6 is an inside view of the dials taken on the line 6—6 of FIGURE 4.
Figure 7:
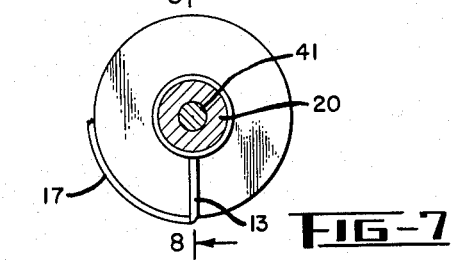
FIGURE 7 is a cross sectional view on the line 7—7 of FIGURE 1.

Adjustment of both the inductor and the capacitor is achieved by rotation of gears 37 and 57. The means for causing rotation of these gears and operation of the locking means 30 and 46 will now be described. A center gear 77 meshes with and operates both of the gears 37 and 57, causing them to rotate in unison in the same direction. As shown best in FIGURE 4, gear 77 is secured by rivets 78 to the large end of a hollow stepped shaft 79. Shaft 79 is journalled in a boss 80 in the mounting plate 12, being held in place by a snap ring 81. A tuning knob 82 is secured to the outer end of shaft 79 by a set screw 83.

Thus, rotation of knob 82 causes gears 77, 37 and 57 to rotate and vary the inductance and capacitance in a manner which will be hereinafter described in detail. First, the means for indicating the setting of the assembly will be described. The inner end of knob 82 has a primary dial 84 attached thereto by means of screws 85. A vernier dial 86 is also actuated by rotation of knob 82: shaft 79 has a section provided with gear teeth 87 which engage a spur gear 88 that drives the vernier dial 86. Dial 86 is journalled on a stub shaft and spacer 89 which projects from an attachment plate 90.

Plate 90 is attached to the mounting plate 12 by screws 91, which project through the panel 8 of the main electrical equipment and are received in threaded projections 91'. It will be noted that only two projections 91' are utilized, but eight are provided (FIGURE 3). The additional projections make it possible to mount the apparatus with the drums 14 and 15 aligned vertically instead of horizontally, or at some intermediate position, and in every case the dials 84 and 86 remain vertically aligned for easy viewing. The dial assembly is closed by a cover 92 which has arcuate reading slots 93. Cover 92 is held in place by screws 99 which are threaded in plate 90.

Operation of the locking means 30 and 46 is controlled by a locking knob 94 attached by a set screw 95 to the outer end of a metal shaft 96 journalled in the hollow shaft 79. A dielectric shaft 97 is attached to shaft 96 by means of a pin 98. The rearward end of shaft 97 is supported in a bearing sleeve 100 formed on the strap 34. Locking nut 46 is actuated by shaft 97 through a mechanism consisting of an actuating arm and collar 101 secured to shaft 97; a connecting link 102; an arm 103 on nut 46; and appropriate connecting screws 104 and 105. Similarly, the locking shaft 30 is actuated by shaft 97 through a mechanism consisting of an actuating arm and collar 106; a connecting link 107; an arm 108 on shaft 30; and appropriate connecting screws.

Operation

The apparatus as shown in the drawings is in unlocked condition ready for adjustment of the inductance and capacitance. Since it is desired to employ the apparatus in a system in which the inductor 1 and capacitor 2 form a resonant circuit, and since it is desired that the ratio of inductance over capacitance of said circuit remain constant over the tuning range, the inductance and capacitance are arranged to increase and decrease in unison, in the same direction, and by the amount required to maintain a constant ratio of inductance over capacitance.

More specifically, when knob 82 is turned clockwise, drum 14 rotates counter-clockwise. This shortens the effective length of the coil and decreases the inductance. At the same time, shaft 53 rotates counter-clockwise which causes the capacitance to decrease, as previously explained. A decrease in the inductance and capacitance will of course result in an increase in the resonant frequency of the circuit. In order to decrease the resonant frequency, knob 82 is turned counter-clockwise to cause an increase in the inductance and capacitance.

When knob 82 has been turned to the desired setting, the locking knob 94 is turned tightly clockwise. This movement causes linkage 101–103 to rotate lock nut 46 into tight abutment with collar 45. This motion of nut 46 serves the dual purpose of locking drum 14 against rotation and providing a tight electrical contact between sleeve 20 and shaft 41. At the same time that nut 46 is actuated, linkage 106–108 rotates rod 30 to press strip 26, 27 tightly against the bar 23. The main purpose of the locking action of rod 30 is to provide a tight electrical connection between coil strip 13 and casing 22, and a secondary purpose is to provide an additional mechanical lock.

The tapered shape of the inductor drum 14 has several functions. One function is to match the change in inductance, per revolution of knob 82, to the change in capacitance per revolution of knob 82. More specifically, it is desired that a plot of inductance and capacitance versus turns of knob 82 will show the inductance line and the capacitance line to be substantially straight and parallel. A cylindrical inductor drum would not provide the desired inductance-capacitance match. Another function of the taper is to provide minimum distributed capacitance which results from the offset or stepped relation between the edges of adjacent turns of the coil strip 13. A further function of the taper is to increase the efficiency by providing a decreased coil diameter at the low inductance adjustment of the inductor.

Although a preferred embodiment of the present invention is shown and described herein, it is to be understood that modifications may be made therein without departing from the spirit and scope of the invention as set forth in the appended claims.

Having thus described the invention, what is claimed as new and desired to be secured by Letters Patent is as follows:

1. Resonant circuit apparatus comprising a variable inductor and a variable capacitor, said inductor comprising a dielectric drum and a storage drum arranged adjacent each other, a conductive metallic strip having opposite ends connected to said drums, said storage drum and the portion of conductive metallic strip wound thereon forming no part of the resonant circuit, and means for simultaneously rotating said dielectric drum to vary the inductance and adjusting said variable capacitor to vary the capacitance, said dielectric drum being noncylindrical and the surface thereof being formed with a helical step, said metallic strip being wound on said step in spaced coils, the adjacent edges of adjacent coils being radially off-set to minimize the distributed capacitance between the coils.

2. A variable inductor comprising a non-cylindrical dielectric drum elongated along a longitudinal axis and rotatable thereabout, a conductive metallic strip spirally wound on said drum in axially spaced coils the number of which vary in correlation to rotation of the drum with one end portion of the strip constituting an end coil and a terminal portion of the strip projecting off said drum the adjacent edges of adjacent axially spaced coils being radially offset to minimize the distributed capacitance between the coils, and means spaced from said drum in positive electrical contact with the portion terminal of said strip which projects off the drum, the portion of said conductive strip lying on the side of said positive electrical contact remote from said dielectric drum being electrically isolated from said spirally wound coils.

3. A variable inductor comprising a noncylindrical dielectric drum elongated along a longitudinal axis and rotatably thereabout, a conductive metallic strip spirally wound on said drum in axially spaced coils, the number of which vary in correlation to the rotation of the drum, with one end portion of the strip constituting an end coil and a terminal portion of the strip projecting off said drum, and means spaced from said drum in positive electrical contact with the terminal portion of said strip which projects off the drum, the portion of said conductive strip lying on the side of said positive electrical contact remote from said dielectric drum being electrically isolated from said spirally wound coils, the surface of said drum being tapered and containing helical steps on which said conductive metallic strip is spirally wound in the axially spaced coils, the adjacent edges of adjacent coils being radially off-set to minimize the distributed capacitance between the coils.

4. Resonant circuit apparatus comprising a mounting plate, a tapered dielectric drum and a tapered storage drum, the surface of which is formed with helical steps, mounted on one side of said plate for rotation on parallel axes, a conductive metallic strip having opposite ends connected to said drums, said metallic strip being wound on said steps in spaced coils, the adjacent edges of adjacent coils being radially off-set to minimize the distributed capacitance between the coils, a variable vacuum dielectric capacitor mounted in axial alignment with said storage drum, and means for rotating said drums and simultaneously adjusting said capacitor whereby the inductance-to-capacitance ratio is maintained constant.

5. Resonant circuit apparatus as claimed in claim 4 in which said storage drum is shorter than said dielectric drum and larger in diameter at its small end whereby when all of said conductive metallic strip is wound on said storage drum the number of coils is substantially less than the number of coils on said dielectric drum when all of the conductive metallic strip is wound thereon.

6. Resonant circuit apparatus as claimed in claim 4 comprising a support member secured to the end of said capacitor and rotatably receiving the end of said dielectric drum.

7. Resonant circuit apparatus as claimed in claim 4 in which said rotating and adjusting means comprises a shaft operatively connected to said capacitor, drive means interconnecting said shaft and said dielectric drum for simultaneous rotation, said storage drum being mounted around said shaft for rotation relative thereto, and a spring connected between said storage drum and said shaft to bias the storage drum in a rotary direction to maintain tension in said metallic strip in all positions thereof.

8. Resonant circuit apparatus as claimed in claim 4 in which actuation of said rotating and adjustment means causes said inductance and capacitance to vary in the same direction and by the amount required to maintain a constant ratio of inductance over capacitance.

9. Variable inductor apparatus comprising a mounting plate, a dielectric drum and a storage drum mounted on one side of said plate for rotation on parallel axes, a conductive metallic strip having opposite ends connected to said drums, an operating shaft projecting through said mounting plate and operatively connected to said drums, an attachment plate connected by screws to the other side of said mounting plate, a dial wheel rotatable with said shaft and located on the outside of said attachment plate, and said attachment plate being arranged so it can be spaced from said mounting plate along said shaft whereby an equipment mounting wall can be received between said plate.

10. Variable inductor apparatus as claimed in claim 9 in which said storage drum is surrounded by a conductive metallic casing having an elongated slot therein through which said strip passes, and means associated with said slot resiliently impinging in positive electrical engagement against said conductive metallic strip.

11. Variable inductor apparatus comprising a mounting plate, a dielectric drum and a storage drum mounted on one side of said plate for rotation on parallel axes, a conductive metallic strip having opposite ends connected to said drums, an operating shaft projecting through said mounting plate and operatively connected to said drums, an attachment plate connected by screws to the other side of said mounting plate, a dial wheel rotatable with said shaft and located on the outside of said attachment plate, said attachment plate being arranged so it can be spaced from said mounting plate along said shaft whereby an equipment mounting wall can be received between said plates, a casing surrounding said storage drum and having an elongated slot through which said metallic strip passes, a flexible metal strip forming one wall of said slot, a camming shaft biasing said flexible strip toward the other wall of said slot, a locking shaft inside said operating shaft, a linkage connecting said locking shaft to said camming shaft, a variable capacitor attached to the end of said casing remote from said mounting plate, and a support member secured to said capacitor and rotatably supporting the end of said dielectric drum remote from said mounting plate.

12. Variable inductor apparatus as claimed in claim 11 comprising means for locking said dielectric drum against rotation, said locking shaft being rotatably supported by said support member, and an operating connection between said locking shaft and said locking means.

13. Variable inductor apparatus comprising a dielectric drum and a storage drum rotatably arranged adjacent each other, a conductive metallic strip having opposite ends connected to said drums, means for rotating said drums, conductive wall means providing a slot through which the intermediate portion of said strip is received in engagement with the walls of said slot, one wall of said slot being movable relative to the other, and means for forcing said one wall toward the other to grip said strip between said walls.

14. Variable inductor apparatus according to claim 13, in which means are provided for locking said dielectric drum against rotation, and means are provided for simultaneously effecting operation of said wall forcing means to grip the metallic strip and operation of said locking means to lock the dielectric drum.

15. Variable inductor apparatus comprising a mounting plate, a dielectric drum and a storage drum mounted on one side of said plate for rotation on parallel axes, a conductive metallic strip having opposite ends connected to said drums, a casing surrounding said storage drum and having an elongated slot therein through which said strip passes with one wall of said slot being a flexible metal strip, an operating shaft projecting through said mounting plate and operatively connected to said drums, a locking shaft inside said operating shaft, a camming shaft engaging said flexible strip, an attachment plate connected by screws to the other side of said mounting plate, a dial wheel rotatable with said shaft and located on the outside of said attachment plate, said attachment plate being arranged so it can be spaced from said mounting plate along said shaft whereby an equipment mounting wall can be received between said attachment and mounting plates, and a linkage connecting said locking shaft to said camming shaft.

16. Variable inductor apparatus comprising a dielectric drum and a storage drum rotatably arranged adjacent each other, a conductive metallic strip having opposite ends connected to said drums, means for rotating said drums, conductive wall means providing a slot through which the intermediate portion of said strip is received in engagement with the walls of the slot, and means for selectively locking said dielectric drum against rotation said locking means including a threaded jam nut means mounted adjacent one end of the dielectric drum and control means for rotating said threaded nut means into locked and unlocked position.

17. The variable inductor apparatus according to claim 16, in which a variable vacuum dielectric capacitor having concentric cylindrical electrodes symmetrical about a longitudinal axis is provided supported on said conductive wall means in axial alignment with said storage drum.

18. The variable inductor apparatus according to claim 17, in which dielectric means are interposed between said variable vacuum dielectric capacitor and said conductive wall to electrically insulate one from the other to provide a parallel resonant circuit.

References Cited by the Examiner

UNITED STATES PATENTS

| | | | |
|---|---|---|---|
| 1,936,671 | 11/1933 | Hurt | 334—38 |
| 2,223,080 | 11/1940 | Swarbrick | 334—69 |
| 2,542,416 | 2/1951 | Kach et al. | 334—69 |
| 2,659,057 | 11/1953 | Legg et al. | 336—15 |
| 2,659,794 | 11/1953 | Mairs | 336—15 |
| 2,666,905 | 1/1954 | Gerlach | 336—15 |
| 2,858,440 | 10/1958 | Giacoletto | 334—69 |
| 2,860,249 | 11/1958 | Merriam | 334—80 |
| 2,988,638 | 6/1961 | Knausenberger | 334—38 |

FOREIGN PATENTS 813,050  9/1951  Germany.

HERMAN KARL SAALBACH, *Primary Examiner.*

R. F. HUNT, *Assistant Examiner.*